US007765500B2

(12) United States Patent
Hakura et al.

(10) Patent No.: US 7,765,500 B2
(45) Date of Patent: Jul. 27, 2010

(54) AUTOMATED GENERATION OF THEORETICAL PERFORMANCE ANALYSIS BASED UPON WORKLOAD AND DESIGN CONFIGURATION

(75) Inventors: Ziyad Hakura, Mountain View, CA (US); John Tynefield, Los Altos, CA (US); Thomas Green, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 147 days.

(21) Appl. No.: 11/983,657

(22) Filed: Nov. 8, 2007

(65) Prior Publication Data

US 2009/0125854 A1    May 14, 2009

(51) Int. Cl.
    G06F 17/50    (2006.01)
(52) U.S. Cl. .............................................. 716/4; 716/1
(58) Field of Classification Search ................ 716/1, 716/4
    See application file for complete search history.

(56) References Cited

U.S. PATENT DOCUMENTS

| | | | |
|---|---|---|---|
| 5,752,062 A | 5/1998 | Gover et al. | |
| 5,757,919 A | 5/1998 | Herbert et al. | |
| 5,815,154 A | 9/1998 | Hirschtick et al. | |
| 5,978,484 A | 11/1999 | Apperson et al. | |
| 6,016,474 A | 1/2000 | Kim et al. | |
| 6,157,618 A | 12/2000 | Boss et al. | |
| 6,330,008 B1 | 12/2001 | Razdow et al. | |
| 6,362,825 B1 | 3/2002 | Johnson | |
| 6,668,325 B1 | 12/2003 | Collberg et al. | |
| 6,732,060 B1 * | 5/2004 | Lee ............................ | 702/118 |
| 6,901,582 B1 | 5/2005 | Harrison | |
| 6,943,800 B2 | 9/2005 | Taylor et al. | |
| 7,047,519 B2 | 5/2006 | Bates et al. | |
| 7,095,416 B1 | 8/2006 | Johns et al. | |
| 7,107,484 B2 | 9/2006 | Yamazaki et al. | |
| 7,173,635 B2 | 2/2007 | Amann et al. | |
| 7,237,151 B2 | 6/2007 | Swoboda et al. | |
| 7,260,066 B2 | 8/2007 | Wang et al. | |
| 7,277,826 B2 | 10/2007 | Castelli et al. | |
| 7,395,426 B2 | 7/2008 | Lee et al. | |
| 7,420,563 B2 | 9/2008 | Wakabayashi | |

(Continued)

OTHER PUBLICATIONS

"maxVUE Grapic Editor", Metso Automation, 2005, pp. 1-6, http://www.metsoautomation.com/automation/indes.nsf/FR?Readform&ATL=automation/ed_prod.nsf/WebWID/WTB-041110-22256F-2445A; eHB.

(Continued)

Primary Examiner—Jack Chiang
Assistant Examiner—Magid Y Dimyan

(57) ABSTRACT

A method of more efficiently, easily and cost-effectively analyzing the performance of a device model is disclosed. Embodiments enable automated generation of theoretical performance analysis for a device model based upon a workload associated with rendering graphical data and a configuration of the device model. The workload may be independent of design configuration, thereby enabling determination of the workload without simulating the device model. Additionally, the design configuration may be updated or changed without re-determining the workload. Accordingly, the graphical data may comprise a general or random test which is relatively large in size and covers a relatively large operational scope of the design. Additionally, the workload may comprise graphical information determined based upon the graphical data. Further, the theoretical performance analysis may indicate a graphics pipeline unit of the device model causing a bottleneck in a graphics pipeline of the device model.

22 Claims, 9 Drawing Sheets

U.S. PATENT DOCUMENTS

| | | |
|---|---|---|
| 7,505,953 B2 | 3/2009 | Doshi |
| 7,555,499 B2 | 6/2009 | Shah et al. |
| 2001/0044928 A1* | 11/2001 | Akaike et al. ............... 716/18 |
| 2002/0157086 A1 | 10/2002 | Lewis et al. |
| 2003/0043022 A1 | 3/2003 | Burgan et al. |
| 2003/0214660 A1 | 11/2003 | Plass et al. |
| 2004/0085894 A1 | 5/2004 | Wang et al. |
| 2004/0130552 A1 | 7/2004 | Duluk, Jr. et al. |
| 2005/0222881 A1 | 10/2005 | Booker |
| 2005/0243094 A1 | 11/2005 | Patel et al. |
| 2005/0273652 A1 | 12/2005 | Okawa et al. |
| 2005/0278684 A1* | 12/2005 | Hamilton et al. ............ 716/18 |
| 2006/0080625 A1* | 4/2006 | Bose et al. .................... 716/5 |
| 2006/0109846 A1 | 5/2006 | Lioy et al. |
| 2006/0161761 A1 | 7/2006 | Schwartz et al. |
| 2006/0185017 A1 | 8/2006 | Challener et al. |
| 2007/0115292 A1* | 5/2007 | Brothers et al. ............ 345/506 |
| 2007/0274284 A1 | 11/2007 | Dendukuri et al. |
| 2008/0007563 A1 | 1/2008 | Aronson et al. |
| 2008/0095090 A1 | 4/2008 | Lee et al. |

OTHER PUBLICATIONS

A Relational Debugging Engine for the Graphics Pipeline, Duca et al., http://citeseer.ist.psu.edu/cache/papers/cs2/167/http:zSzzSzwww.cs.jhu.eduzSz~cohenzSzPublicationszSzgldb.pdf/a-relational-debugging-engine.pdf International Conference on Computer Graphics and Interactive Techniques, ACM SIGGRAPH 2005, pp. 453-463, LA, ISSN:0730-0301.

ATI Radeon X800, 3D Architecture White Paper, ATI, 2005, pp. 1-13, with proof of seniority (4 pages), according to ACM bibliograghy regarding the document: "The Direct3D 10 System", ACM TOG, vol. 25, Iss. 3 (Jul. 2006), Reference 1; eHG.

gDEBugger, graphicREMEDY, http://www.gremedy.com/, Aug. 7, 2006.

N. Tatarchuk, "New RenderMonkey Features for DirectX and OpenGL Shader Development", Game Developers Conference, Mar. 2004.

gDEBugger, graphicREMEDY, http://www.gremedy.com/, Jul. 29, 2005.

C. Cebenoyan and M. Wloka, "optimizing the graphics pipeline", 2003, Nvidia GDC Presentation Slide.

* cited by examiner

125

| State Bucket 1 | Graphical Operation 1 | Graphical Information 1 |
| --- | --- | --- |
| | Graphical Operation 2 | |
| | Graphical Operation 3 | |
| State Bucket 2 | Graphical Operation 4 | Graphical Information 2 |
| | Graphical Operation 5 | Graphical Information 3 |
| | Graphical Operation 6 | Graphical Information 4 |
| State Bucket 3 | Graphical Operation 7 | Graphical Information 5 |
| | Graphical Operation 8 | Graphical Information 6 |

FIGURE 3

AUTOMATED GENERATION OF THEORETICAL PERFORMANCE ANALYSIS BASED UPON WORKLOAD AND DESIGN CONFIGURATION

BACKGROUND OF THE INVENTION

Determining the theoretical performance of an integrated circuit design is often used to perform initial studies on a given design. By altering or modifying the design, the performance of the design may be improved without expending the resources required to manufacture and test physical integrated circuits. Additionally, errors or bugs in the design may be corrected to further improve the design before production.

Verification of the performance of an RTL design relies on determining the theoretical performance of the design. For example, the theoretical performance of an integrated circuit design may be compared to performance of an RTL design to verify the performance thereof. Such verification is commonly used to perform final debugging of the design and increase confidence in the robustness of the design.

Conventional approaches to determining the theoretical performance of an integrated circuit design involve running many directed tests on a simulated model of a specific integrated circuit design. Results from each simulation are manually copied into a spreadsheet program and used to determine performance analysis for the integrated circuit design.

Such conventional approaches to determining performance analysis for an integrated circuit design are limited given the time and expense of simulating integrated circuit models. For example, the size of each directed test must be made relatively small to reduce the time and expense of the simulation, thereby providing a very small picture of the operation of the design. Accordingly, changes to the configuration of the design are often made that improve one area of the design while negatively affecting numerous other areas. Thus, the number of directed tests required to effect an improvement in the overall operation of the integrated circuit design is increased, thereby increasing the time and expense required to perform initial studies or formal verification on an integrated circuit design. Moreover, most changes to an integrated circuit design require the simulation for each directed test to be performed again, thereby further increasing time and cost.

Additionally, writing or producing directed tests based upon performance analysis of an integrated circuit design is difficult and time consuming given the required amount of skill and insight into the design. Further, producing directed tests to reduce the amount of simulation associated with performing initial studies or formal verification is also difficult and time consuming.

SUMMARY OF THE INVENTION

Accordingly, a need exists to reduce the time and cost of analyzing an integrated circuit design. A need also exists to reduce the amount of simulation involved with generating performance analysis of an integrated circuit design. Additionally, a need exists for a test which provides insight into a larger portion of an integrated circuit design without significantly increasing the time and cost associated with generating the performance analysis for the integrated circuit design. A need also exists for a test used to generate performance analysis for an integrated circuit design which is easier to produce and requires less insight into the design. Embodiments of the present invention provide novel solutions to these needs and others as described below.

Embodiments are directed to a method of more efficiently, easily and cost-effectively analyzing the performance of a device model. More specifically, embodiments enable automated generation of theoretical performance analysis for a hardware component or device model based upon a workload associated with rendering graphical data and also based upon a configuration of the device model. The workload may be independent of design configuration (e.g., not specific to any particular design configuration), thereby enabling determination of the workload without simulating the device model. Additionally, the design configuration may be updated or changed without re-determining the workload in one embodiment. Accordingly, the graphical data may comprise a general (e.g., non-directed) or random test which is relatively large in size and covers a relatively large operational scope of the design. Additionally, the workload may comprise graphical information (e.g., a number of primitives, pixels, etc., to be rendered) determined based upon the graphical data (e.g., a software application operable to generate graphical operations, state information, etc., for rendering graphical images). Further, the theoretical performance analysis may indicate a graphics pipeline unit of the device model causing a bottleneck in a graphics pipeline of the device model.

In one embodiment, a computer-implemented method of analyzing performance of a device model includes accessing graphical data and determining a workload associated with rendering the graphical data. Configuration information associated with the device model (e.g., comprising a model of a graphics processor) is accessed, wherein the configuration information is independent of the determined workload. Theoretical performance analysis is automatically generated for the device model processing the graphical data, wherein the theoretical performance analysis is generated based upon the determined workload and the configuration information, and wherein the theoretical performance analysis comprises information about processing of the graphical data by at least one graphics pipeline unit of the device model. The information may indicate a graphics pipeline unit of the device model causing a bottleneck in a graphics pipeline of the device model. The method may also include accessing updated configuration information associated with the device model and automatically generating updated theoretical performance analysis for the device model based upon the determined workload and the updated configuration information. Alternatively, the method may also include accessing configuration information associated with a second device model and automatically generating theoretical performance analysis for the second device model based upon the determined workload and the configuration information associated with the second device model. The method may also include processing the graphical data on a device RTL model associated with the device model, generating performance analysis for the device RTL model, and comparing the performance analysis of the device RTL model with the theoretical performance analysis for verifying performance of the device RTL model.

In another embodiment, a computer-usable medium may include computer-readable program code embodied therein for causing a computer system to perform a method of analyzing performance of a device model as discussed above. And in yet another embodiment, a computer system includes a processor and a memory, wherein the memory comprises instructions that when executed on the processor implement a method of analyzing performance of a device model as discussed above.

BRIEF DESCRIPTION OF THE DRAWINGS

The present invention is illustrated by way of example, and not by way of limitation, in the figures of the accompanying drawings and in which like reference numerals refer to similar elements.

FIG. 3 shows an exemplary workload information in accordance with one embodiment of the present invention.

DETAILED DESCRIPTION OF THE INVENTION

Figure 1:
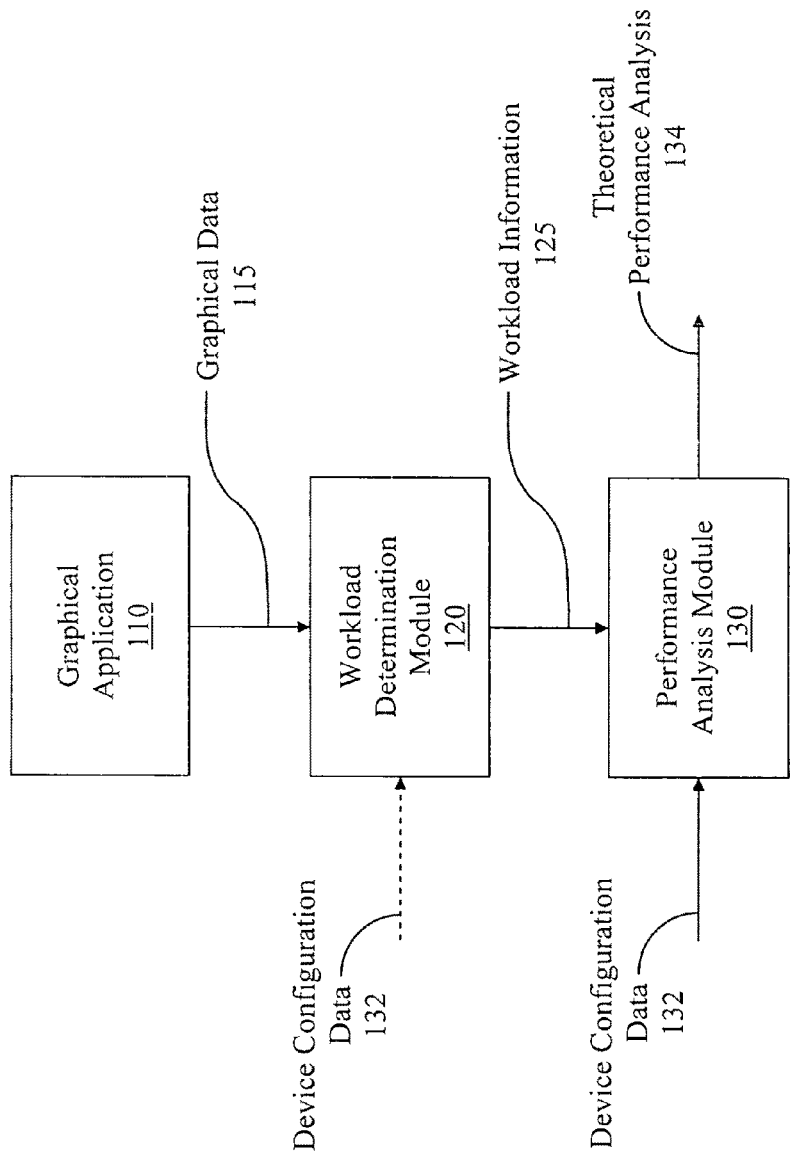
FIG. 1 shows an exemplary data flow diagram in accordance with one embodiment of the present invention.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "accepting," "accessing," "adding," "adjusting," "analyzing," "applying," "assembling," "assigning," "calculating," "capturing," "combining," "commencing," "communicating," "comparing," "collecting," "creating," "defining," "depicting," "detecting," "determining," "displaying," "establishing," "executing," "exiting," "generating," "grouping," "identifying," "initiating," "interacting," "modifying," "monitoring," "moving," "outputting," "performing," "placing," "presenting," "processing," "programming," "querying," "removing," "repeating," "sampling," "sorting," "storing," "subtracting," "tracking," "transforming," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

EMBODIMENTS OF THE INVENTION

FIG. 1 shows exemplary data flow diagram 100 in accordance with one embodiment of the present invention. As shown in FIG. 1, graphical data 115 may be accessed by workload determination module 120 from graphical application 110 (e.g., via one or more drivers, a graphical API such as Direct3D or OpenGL, etc.). Graphical data 115 may comprise one or more graphical operations (e.g., graphical draw calls, etc.) for use in rendering and/or displaying graphical objects. Additionally, graphical data 115 may comprise state data associated with processing of the graphical operation, where the state data may comprise information about how one or more graphical pipeline units should process the graphical operation.

Workload determination module 120 may generate workload information 125 based upon graphical data 115. Workload information 125 may comprise graphical information determined from graphical data 115, where the graphical information may comprise a number of primitives (e.g., polygons, triangles, etc.) used to render an image, a number of pixels of the image to be rendered, a type of shading applied to the pixels of the image to be rendered, a number of bytes accessed by a frame buffer when rendering the image, and a number of texels used in rendering the image, etc. For example, module 120 may examine graphical operations and state data (e.g., associated with the graphical operations) of graphical data 115 (e.g., produced in response to execution of graphical application 110), and in response thereto, determine an exemplary workload of one triangle, 30,000 pixels, four bytes per pixel, flat shading applied to the pixels, and only color writes applied to the pixels. This workload may represent work or operations to be performed by one or more units of a graphics pipeline (e.g., graphics pipeline 200 discussed below with respect to FIG. 2) when rendering an image.

Figure 2:
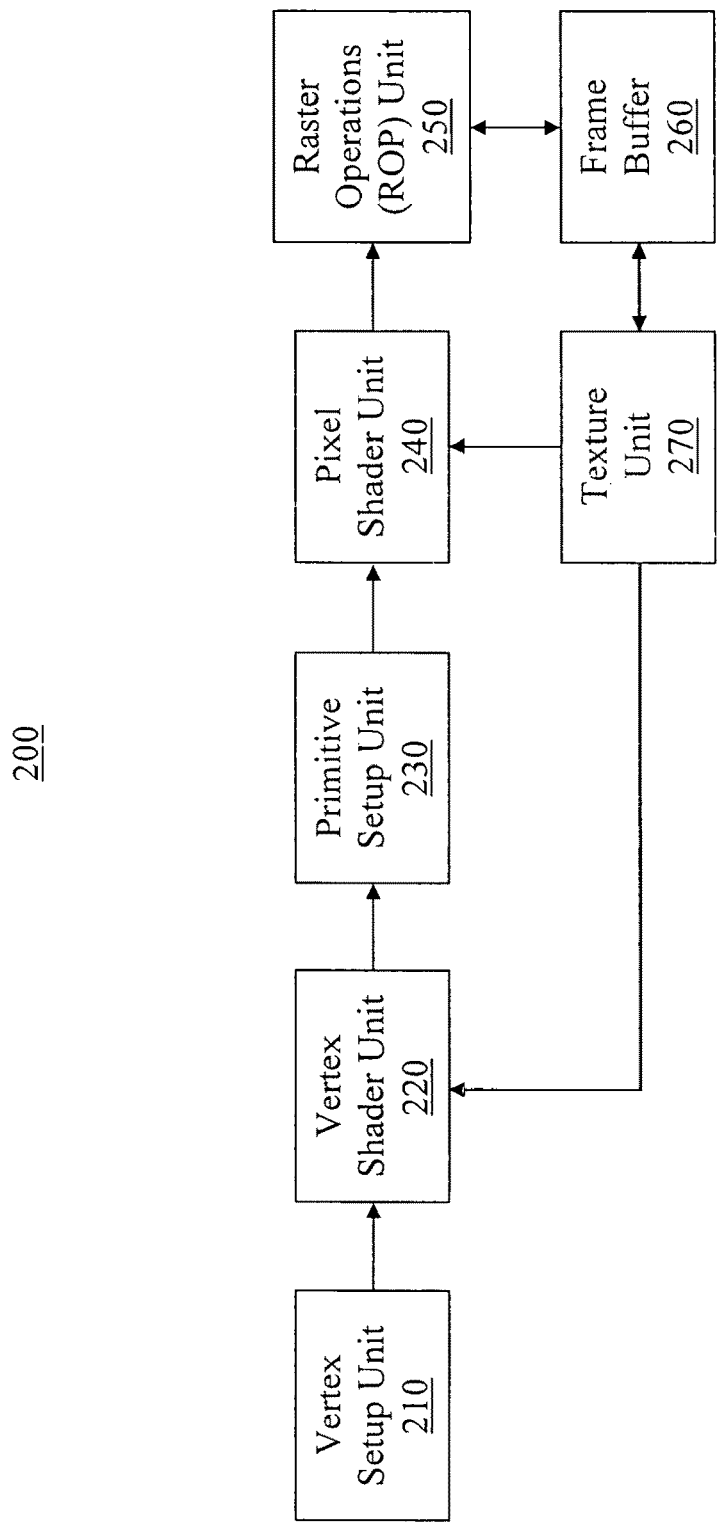
FIG. 2 shows an exemplary graphics pipeline in accordance with one embodiment of the present invention.

FIG. 2 shows exemplary graphics pipeline 200 in accordance with one embodiment of the present invention. Graphics pipeline 200 may be implemented within a graphics processing unit or similar device, or alternatively, within a model of a graphics processing unit or model of a similar device. As shown in FIG. 2, vertex setup unit 210 receives vertices and assembles all the data required for vertex shader unit 220 to run a given vertex program. For example, vertex setup unit 210 may gather information about a given vertex, which may include its position, normal, color, smoothing attributes, etc. Once this information is assembled, it is passed to the vertex shader unit 220 where a vertex program is run to transform the vertices from model space to camera space, calculate lighting, perform skinning, change the shape or size of the primitive being drawn, change the position or orientation of the primitive being drawn, etc. Using information from vertex shader unit 220, the primitive setup unit 230 may then collect and convert the vertices into primitives (e.g., triangles, etc.). The primitives are then assembled such that they may effectively be converted to pixels by later states of pipeline 200.

Data from primitive setup unit 230 is fed to pixel shader unit 240 for application of pixel shader programs to pixels associated with the primitives. For example, pixel shader programs may perform per-pixel lighting, bump mapping, etc., where the pixel shader programs may access pixel shader constants during execution. Pixel shader unit 240 may output to several (e.g., four) render targets or separate buffers, where the render targets may be accessed for later use (e.g., input as textures, combined, displayed, etc.). Thereafter, the data stream is fed to ROP unit 250 for performing blending operations with what is currently within frame buffer 260. The blending may be performed in accordance with blending settings (e.g., alpha blending enabled, alpha test enabled, alpha test value, stencil enabled, etc.) provided to ROP unit 250. After rasterization operations are performed by ROP unit 250, the data may be written to frame buffer 260.

Additionally, texture unit 270 may communicate with frame buffer 260 and send texture data to vertex shader unit 220. Similarly, texture unit 270 may communicate with frame buffer 260 and send texture data to pixel shader unit 240 while primitive setup unit 230 assembles primitives to be shaded.

Although pipeline 200 is depicted in FIG. 2 with specific pipeline units, it should be appreciated that a larger or smaller number of units may be used in other embodiments. It should also be appreciated that the units of pipeline 200 may be alternatively grouped and/or coupled in other embodiments. Additionally, it should be appreciated that one or more units of pipeline 200 may operate in parallel. Further, it should be appreciated that one or more operations of any of the units of pipeline 200 may be performed in parallel.

Turning back to FIG. 1, module 120 may comprise any module capable of reading graphical data (e.g., 115) and generating workload information (e.g., 125). In one embodiment, the workload information 125 may be generated without accessing information associated with a specific device model (e.g., number of units of a graphics pipeline, data flow through the graphics pipeline, performance of each unit of the graphics pipeline, etc.). In this manner, workload information 125 may be independent of a configuration of a device design (e.g., not specific to any particular device configuration), and therefore, may be generated once and used for various configurations of the same device model, for various different device models, etc. Accordingly, graphical data 115 may comprise a general (e.g., non-directed) or random test which is relatively large in size (e.g., comprising many terabytes of data) and covers a relatively large operational scope of a design (e.g., for which theoretical performance analysis is generated). Alternatively, graphical data 115 may comprise a directed test for triggering or testing a specific portion or portions of a design (e.g., for which theoretical performance analysis is generated).

Alternatively, module 120 may access device configuration data 132 in one embodiment, thereby enabling the generation of workload information 125 which is specific to at least one device and/or device configuration. For example, if it is known that a given device has a cache, then the workload may be reduced accordingly to account for processing that may not be performed given the information stored in the cache. As such, non-directed and/or directed tests may be performed (e.g., by module 130) using workload information 125 specific to one or more devices and/or device configurations. In one embodiment, module 120 may be implemented by a hardware-specific simulator capable of generating workload information 125 specific to that hardware component and/or hardware component configuration.

FIG. 3 shows exemplary workload information 125 in accordance with one embodiment of the present invention. As shown in FIG. 3, workload information 125 comprises graphical information (e.g., graphical information 1 through graphical information 6) determined from graphical data (e.g., 115), where each piece of graphical information (e.g., graphical information 1, graphical information 2, etc.) may comprise, for example, a number of primitives (e.g., triangles, etc.) used to render an image, a number of pixels of the image to be rendered, a type of shading applied to the pixels of the image to be rendered, a number of bytes accessed by a frame buffer when rendering the image, and a number of texels used in rendering the image, etc. Additionally, as shown in FIG. 3, each piece of graphical information may be associated with one or more graphical operations (e.g., graphical operation 1 through graphical operation 8) and/or associated with one or more "state buckets" (e.g., state bucket 1 through state bucket 3).

A state bucket may comprise a grouping of graphical operations, where each graphical operation in a given state bucket may share at least one common state attribute. A state attribute may comprise any information used by a unit of a graphics pipeline (e.g., 200) that controls how the graphics pipeline unit (e.g., 210-270) processes a data stream fed through the graphics pipeline (e.g., 200). For example, state attributes used by the pixel shader unit (e.g., 240) may comprise pixel shader programs, pixel shader constants, render target information, graphical operation parameters, etc. As such, state attributes may direct the pixel shader unit (e.g., 240) to shade certain pixels and how to shade the pixels using a given pixel shader program, group of pixel shader constants, etc.

Although FIG. 3 shows a specific number of state buckets, graphical operations, and pieces of graphical information, it should be appreciated that workload information 125 may comprise any number of state buckets, graphical operations, and graphical information in other embodiments. It should also be appreciated that pieces of graphical information may not be associated with one or more graphical operations in other embodiments. Additionally, It should be appreciated that pieces of graphical information may not be associated with one or more state buckets in other embodiments. Further, it should be appreciated that the graphical information of workload information 125 may be alternatively associated with graphical operations and/or state buckets in other embodiments.

Turning back to FIG. 1, performance analysis module 130 may output theoretical performance analysis 134 based upon workload information 125 (e.g., accessed from workload determination module 120) and device configuration data 132. Device configuration data 132 may comprise information about at least one device and/or at least one device model. For example, where theoretical performance analysis 134 comprises theoretical performance data for a graphics processor, data 132 may comprise information about which graphics pipeline units (e.g., 210-270) make up a graphics pipeline (e.g., 200) of the graphics processor, performance characteristics of each graphics pipeline unit, etc. Additionally, it should be appreciated that data 132 may be independent of workload information 125, thereby enabling updated theoretical performance analysis (e.g., 134) to be output by module 130 in response to new data 125 (e.g., comprising changes to configuration data associated with the same device model, comprising configuration data associated with a different device model, etc.) input to module 130 using the same workload information 125.

In one embodiment, workload information 125 may comprise information unrelated to clock cycles (e.g., of a device for which theoretical performance analysis is generated by module 130). For example, workload information 125 may represent a workload to be performed by at least one graphics pipeline unit, data 132 may comprise information about how each graphics pipeline unit processes the workload (e.g., the amount of work performed per unit of time for each graphics pipeline unit), and the results of calculations performed by module 130 may indicate how long (e.g., represented by a number of clock cycles) each graphics pipeline unit took to process the workload (e.g., as shown in Table 1 below). In this manner, module 130 may assume full utilization (e.g., 100% utilization) of each graphics pipeline unit. Module 130 may also assume that each graphics pipeline unit operates independently of other graphics pipeline units (e.g., does not stall or wait for information from any other graphics pipeline unit) in one embodiment.

TABLE 1

| Workload Information | 1 triangle; 30,000 pixels; 4 bytes/pixel (Bpp); flat shading; color write only | |
|---|---|---|
| Device Configuration Data | Vertex Setup Unit | 2 clocks/triangle (cpt) |
| | Pixel Shader Unit | 24 pixels/clock (ppc) |
| | Raster Operations Unit | 16 pixels/clock (ppc) |
| | Frame Buffer | 80 bytes/clock (Bpc) |
| Calculations Based Upon Workload Information And Device Configuration Data | Vertex Setup Unit | (1 triangle) * (2 cpt) = 2 clocks |
| | Pixel Shader Unit | (30,000 pixels)/ (24 ppc) = 1250 clocks |
| | Raster Operations Unit | (30,000 pixels)/ (16 ppc) = 1875 clocks |
| | Frame Buffer | (30,000 pixels) * (4 Bpp)/ (80 Bpc) = 1500 clocks |

As shown in Table 1, module 130 may calculate how long (e.g., represented in clock cycles) various graphics pipeline units may take to process portions of the workload information 125. For example, a vertex setup unit (e.g., 210) may take 2 clock cycles to process one triangle, a pixel shader unit (e.g., 240) may take 1250 clock cycles to process 30,000 pixels, a raster operations unit (e.g., 250) may take 1875 clock cycles to process 30,000 pixels, a frame buffer (e.g., 260) may take 1500 clocks to access (e.g., read, write, etc.) 30,000 pixels. Accordingly, module 130 may determine from this information that the raster operations unit (e.g., 250) may be the unit causing a bottleneck (e.g., taking the longest time to process the workload) in the graphics pipeline (e.g., 200) in one embodiment. Module 130 may also determine a respective bottleneck percentage (determined by dividing the number of cycles for a unit to process a workload by the largest number of cycles for any unit to process the workload) for each graphics pipeline unit. Module 130 may also determine other information (e.g., primitives processed, primitives processed per cycle, vertices processed, vertices processed per cycle, pixels processed, pixels processed per cycle, etc.) based upon workload information 125 and device configuration data 132 in other embodiments.

Figure 4:
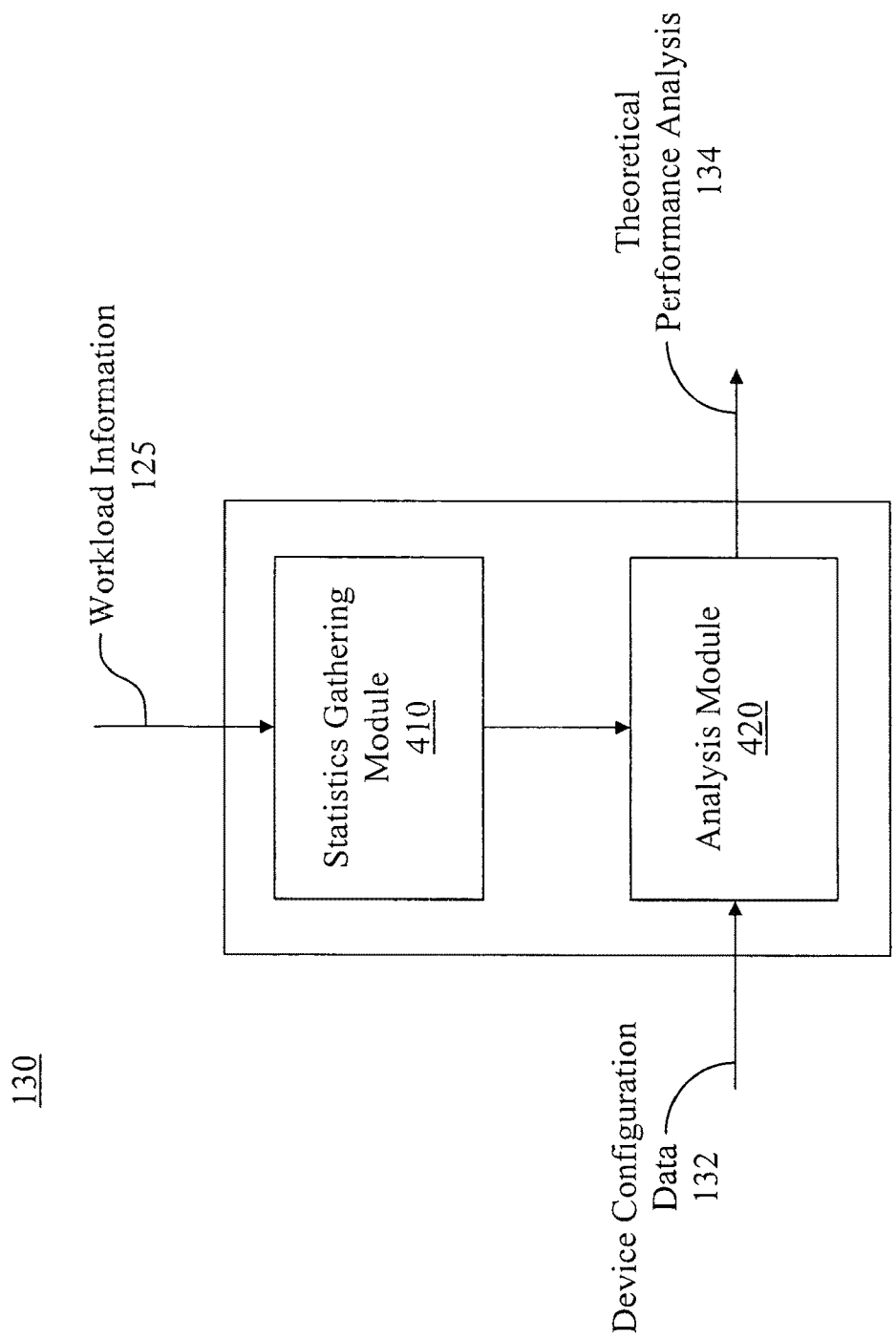
FIG. 4 shows an exemplary performance analysis module in accordance with one embodiment of the present invention.

FIG. 4 shows exemplary performance analysis module 130 in accordance with one embodiment of the present invention. As shown in FIG. 4, module 130 may comprise statistics gathering module 410 and analysis module 420. Module 410 may comprise a memory or other component operable to access, store, and/or communicate workload information 125. Analysis module 420 may access workload information 125 (e.g., from module 410) and device configuration data 132 for processing and generation of theoretical performance analysis 134 in one embodiment.

Figure 5:
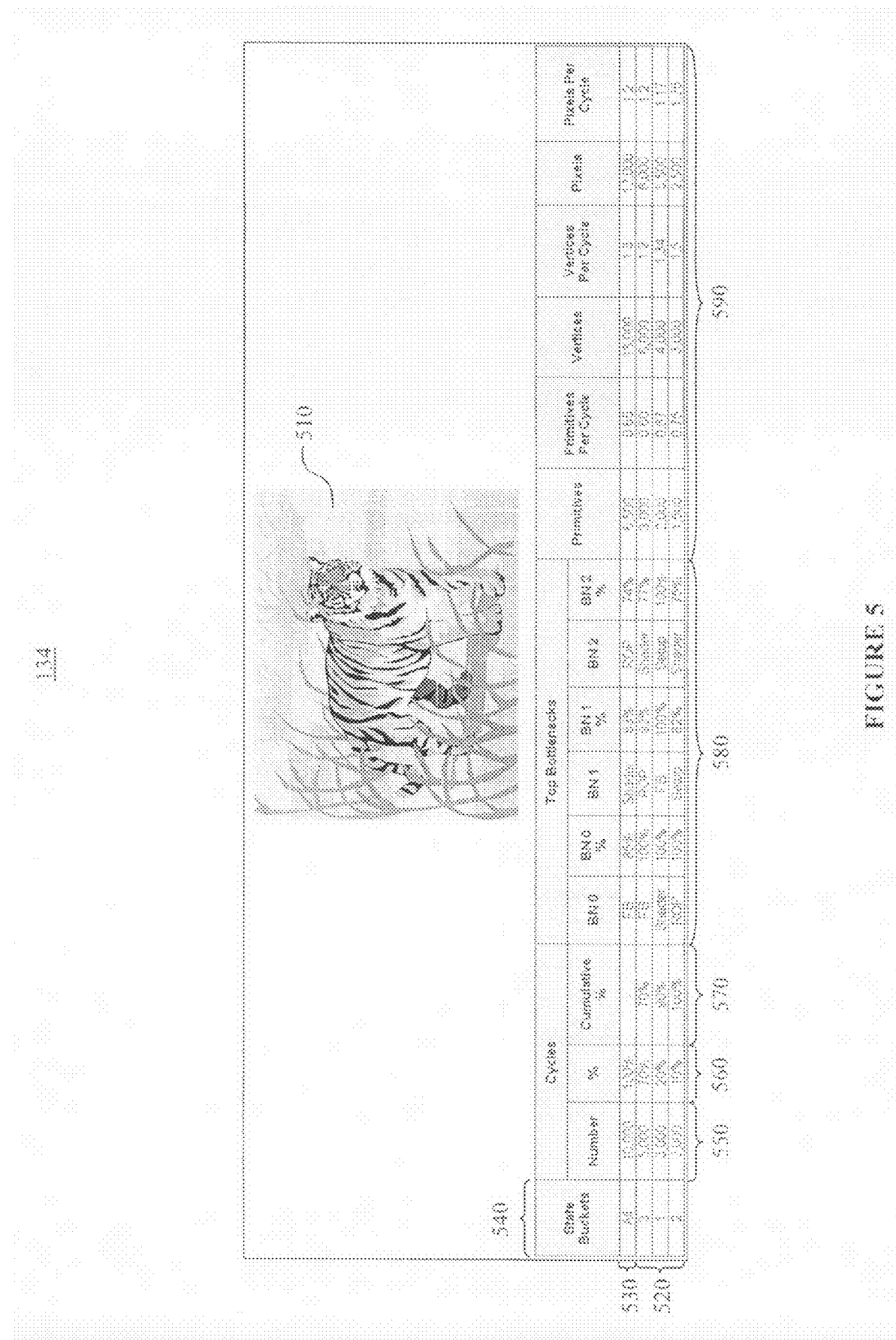
FIG. 5 shows an exemplary theoretical performance analysis in accordance with one embodiment of the present invention.

FIG. 5 shows exemplary theoretical performance analysis 134 in accordance with one embodiment of the present invention. As shown in FIG. 5, analysis 134 may be associated with the rendering of an exemplary image 510. Analysis 134 may comprise information for individual state buckets (e.g., in rows 520) and all state buckets (e.g., in row 530) as indicated by column 540. For example, column 550 may indicate a total number of clock cycles for rendering image 510 (e.g., comprising the number of cycles associated with all state buckets) as well as the number of clock cycles for each state bucket. Column 560 may indicate the percentage of cycles for each row with respect to the total number of cycles.

As shown in FIG. 5, column 570 may indicate a cumulative percentage for each state bucket. For example, state bucket 1 may be assigned a cumulative percentage of 90%, which may comprise the sum of the individual percentages of the current state bucket (e.g., state bucket 1) and all state buckets above the current state bucket (e.g., state bucket 3). In this manner, column 570 indicates that the top two state buckets (e.g., state buckets 1 and 3) comprise 90% of the total cycles for rendering image 510. Accordingly, this information may be used to weight or assign an importance to information in columns 580 and 590, thereby enabling the assessment of how representative the information is in columns 580 and 590 pertaining to state buckets 1 and 3. For example, if 90% of the total cycles is considered representative of the overall performance of the device, then the information pertaining to state bucket 2 may be ignored or assigned a lower importance than the information pertaining to state buckets 1 and 3. Thus, time and cost may be saved when performing initial studies and/or verification on a design using theoretical performance analysis 134.

Rows 520 of column 580 may indicate a degree to which a graphics pipeline unit causes a bottleneck to a graphics pipeline for each state bucket. For example, with regard to state bucket 3, the frame buffer is the top bottleneck with a bottleneck percentage of 100%, the raster operations unit is the next bottleneck with a bottleneck percentage of 92%, and the pixel shader unit is the next bottleneck with a bottleneck percentage of 77%. Each of the bottleneck percentages may be calculated by dividing the number of cycles for each unit processing the workload associated with the respective state bucket by the largest number of cycles for any unit processing the workload (e.g., the number of cycles associated with the unit taking the largest number of cycles to process the workload, or which is the top bottleneck with respect to the respective state bucket).

For example, if the pixel shader unit (e.g., 240) takes 3,850 cycles to process the workload associated with state bucket 3, then module 130 may determine that the bottleneck percentage for the pixel shader unit is 77% for state bucket 3 by dividing 3,850 cycles by the total number of cycles for that state bucket (e.g., 5,000 cycles). Additionally, it should be appreciated that one or more units may tie for the top bottleneck as shown in the row associated with state bucket 1 of column 580.

Row 530 of column 580 may indicate a degree to which a graphics pipeline unit causes a bottleneck to a graphics pipeline for all state buckets. For example, with regard to all state buckets, the frame buffer is the top bottleneck with a bottleneck percentage of 85%, the pixel shader unit is the next bottleneck with a bottleneck percentage of 83%, and the raster operations unit is the next bottleneck with a bottleneck percentage of 74%. Each of the bottleneck percentages may be calculated by dividing the number of cycles for each unit processing the workload associated with all state buckets by the total number of cycles for all state buckets. For example, if the frame buffer (e.g., 260) takes 8,500 cycles to process the workload associated with all state buckets (e.g., the sum of the cycles for the frame buffer for each respective state bucket), then module 130 may determine that the bottleneck percentage for the frame buffer is 85% for all state buckets by dividing 8,500 cycles by the total number of cycles for all state buckets (e.g., 10,000 cycles).

As shown in FIG. 5, column 590 may represent additional information about the workload of one or more state buckets. For example, column 590 may indicate a number of primitives associated with individual state buckets and/or all state buckets, a number of primitives processed per cycle (e.g., the number of primitives in a given row divided by the number of cycles in that row) for individual state buckets or all state buckets, etc. Column 590 may also indicate similar information related to vertices, pixels, etc.

Although FIG. 5 shows analysis 134 comprising a specific number of state buckets (e.g., in column 540), units causing a bottleneck (e.g., in column 580), etc., it should be appreciated that analysis 134 may comprise a different number of state buckets, units causing a bottleneck, etc. in other embodiments. Additionally, it should be appreciated that all numbers and names of graphics pipeline units are merely exemplary, and as such, may be different in other embodiments. Further, it should be appreciated that workload information 134 may comprise additional and/or different information (e.g., raw calculations as shown in Table 1, etc.) in other embodiments.

Figure 6:
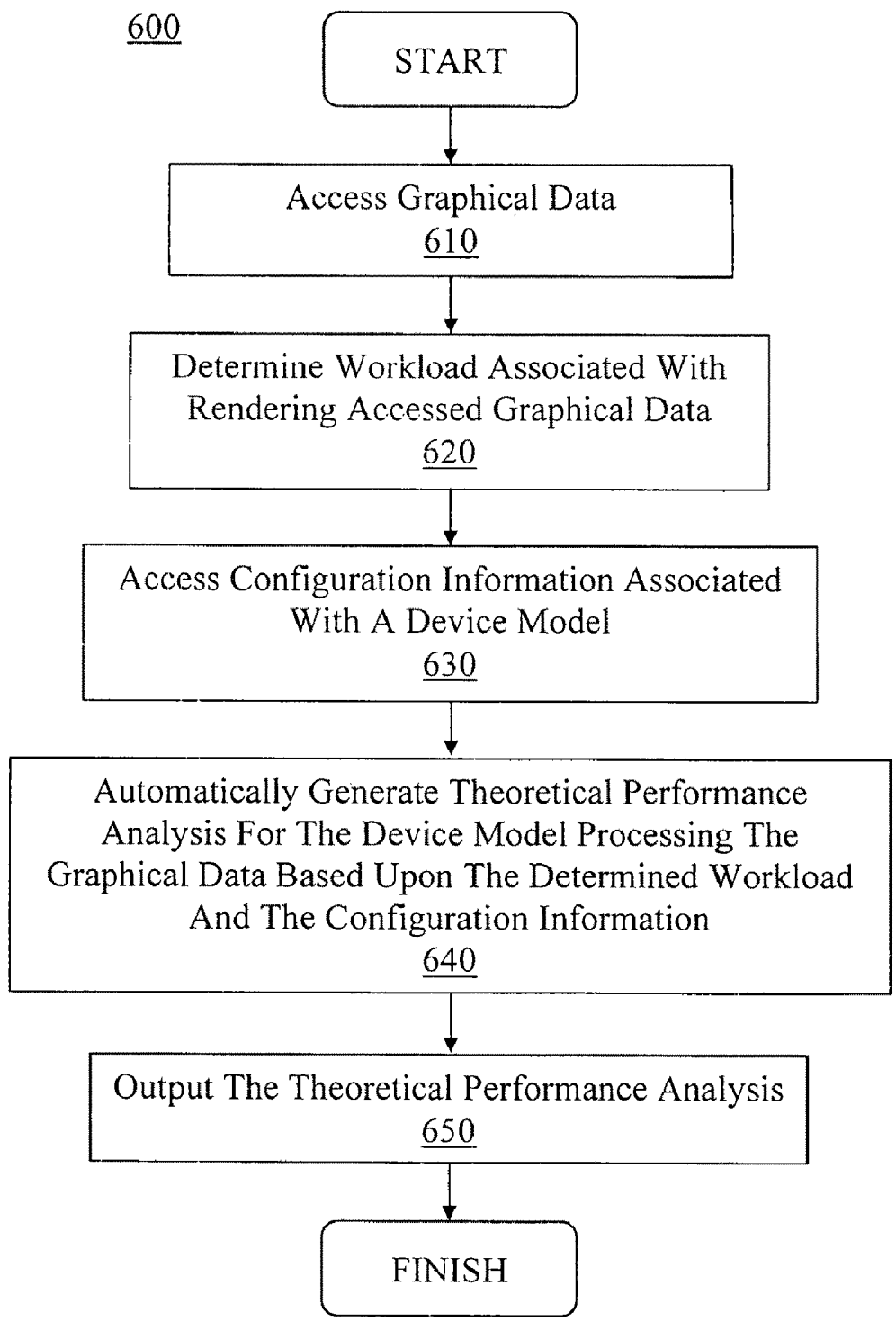
FIG. 6 shows an exemplary computer-implemented process for analyzing the performance of a device model in accordance with one embodiment of the present invention.

FIG. 6 shows exemplary computer-implemented process 600 for analyzing the performance of a device model in accordance with one embodiment of the present invention. As shown in FIG. 6, step 610 involves accessing graphical data (e.g., 115). The graphical data (e.g., 115) may comprise one or more graphical operations (e.g., graphical draw calls, etc.) for use in rendering and/or displaying graphical objects. Additionally, the graphical data (e.g., 115) may comprise state data associated with processing of the graphical operation, where the state data may comprise information about how one or more graphical pipeline units should process the graphical operation.

Step 620 involves determining a workload associated with rendering accessed graphical data (e.g., 115). The workload (e.g., 125) may be determined by a workload determination module (e.g., 120) in one embodiment. Additionally, the determined workload may comprise information unrelated to clock cycles. The workload (e.g., 125) may comprise graphical information determined from the graphical data (e.g., accessed in step 610), where the graphical information may comprise a number of primitives (e.g., polygons, triangles, etc.) used to render an image, a number of pixels of the image to be rendered, a type of shading applied to the pixels of the image to be rendered, a number of bytes accessed by a frame buffer when rendering the image, and a number of texels used in rendering the image, etc.

As shown in FIG. 6, step 630 involves accessing configuration information (e.g., 132) associated with a device model. The workload determined in step 620 may be independent (e.g., not specific to any particular device configuration) of the configuration information accessed in step 630. Additionally, the device model may comprise a model of a graphics processor in one embodiment.

Step 640 involves automatically generating theoretical performance analysis (e.g., 134) for the device model processing the graphical data (e.g., 115) based upon the determined workload (e.g., 125) and the configuration information (e.g., 132). The theoretical performance analysis comprises information about processing of the graphical data by at least one graphical pipeline unit of the device model. For example, the analysis may comprise information about cycles (e.g., as shown in columns 550-570 of FIG. 5), information about units creating a bottleneck in the graphics pipeline (e.g., as shown in column 580 of FIG. 5), other information related to processing of the workload (e.g., as shown in column 590 of FIG. 5), etc. The analysis may also comprise clock cycles indicating how long one or more graphical pipeline units took to process a workload or some portion thereof (e.g., as shown in Table 1 above). The analysis may be grouped by or otherwise associated with graphical operations, state buckets, or some combination thereof, in one embodiment.

Step 650 involves outputting the theoretical performance analysis. The analysis may be stored in one embodiment. Alternatively, it may be rendered (e.g., in tabular form as shown in FIG. 5, in graphical form, etc.) for display on display device. In other embodiments, the analysis may be alternatively output (e.g., printed, communicated for further processing, etc.).

Figure 7:
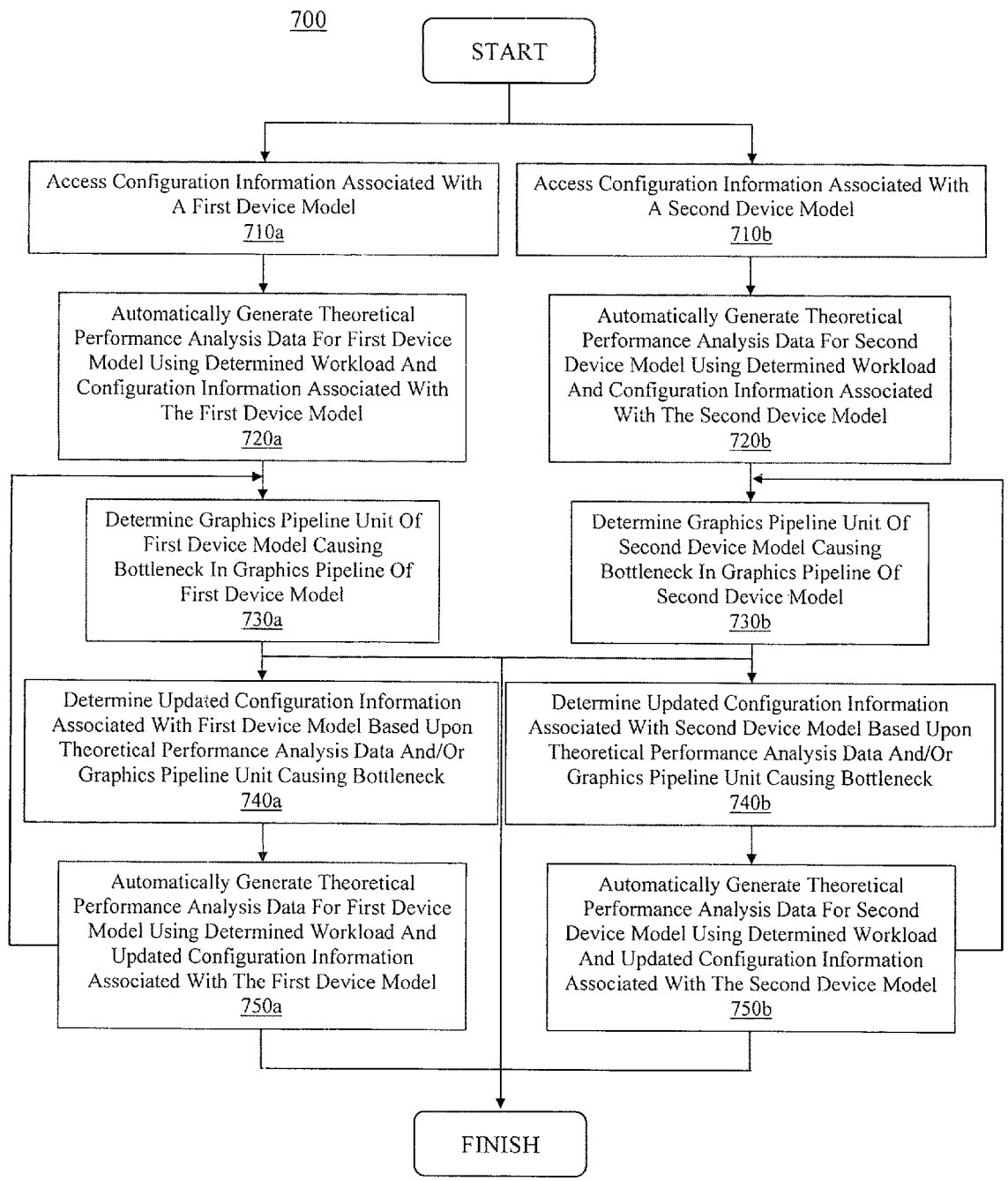
FIG. 7 shows an exemplary computer-implemented process for analyzing the performance of a device model based on updated device configuration information and the same workload information in accordance with one embodiment of the present invention.

FIG. 7 shows exemplary computer-implemented process 700 for analyzing the performance of a device model based on updated device configuration information and the same workload information in accordance with one embodiment of the present invention. As shown in FIG. 7, step 710*a* involves accessing configuration information (e.g., 132) associated with a first device model. Step 720*a* involves automatically determining theoretical performance analysis data (e.g., 134) for the first device model using a determined workload (e.g., determined in accordance with step 620 of FIG. 6) and configuration information associated with the first device model (e.g., accessed in step 710*a*).

Step 730*a* involves determining a graphics pipeline unit of the first device model causing a bottleneck in the graphics pipeline of the first device model. For example, the unit causing the bottleneck may be determined based upon a bottleneck percentage (e.g., as shown in column 580 of FIG. 5), where the graphics pipeline unit with the highest bottleneck percentage may be determined to be the unit causing the bottleneck in the graphics pipeline.

As shown in FIG. 7, step 740*a* involves determining updated configuration information associated with the first device model based upon the theoretical performance analysis data (e.g., as determined in step 720*a*) and/or the graphics pipeline unit causing the bottleneck (e.g., as determined in step 730*a*). The updated configuration information may be associated with a modified or reconfigured device model created in an attempt to improve the performance of the design and/or correct a bug or other flaw of the design.

Step 750*a* involves automatically determining updated theoretical performance analysis data for the first device model using determined workload (e.g., determined in accordance with step 620 of FIG. 6) and the updated configuration information associated with the first device model (e.g., determined in step 740*a*). Thereafter, steps 730*a*-750*a* may be repeated in one embodiment. Alternatively, process 700 may be terminated after step 730*a* (e.g., when the theoretical performance analysis data and/or bottleneck results show acceptable graphics pipeline performance).

As shown in FIG. 7, steps 710*b*-750*b* may be performed analogously to steps 710*a*-750*a*, except that steps 710*b*-750*b* are performed with respect to a second device model and steps 710*a*-750*a* are performed with respect to the first device model. Accordingly, the same workload information (e.g., 125) may be used to determine theoretical performance analysis for updated device configurations of the same device model or configurations of different device models. Additionally, it should be appreciated that process 700 and/or process 600 of FIG. 6 may be used to perform initial studies (e.g., prior to producing the physical device) on device models.

Figure 8:
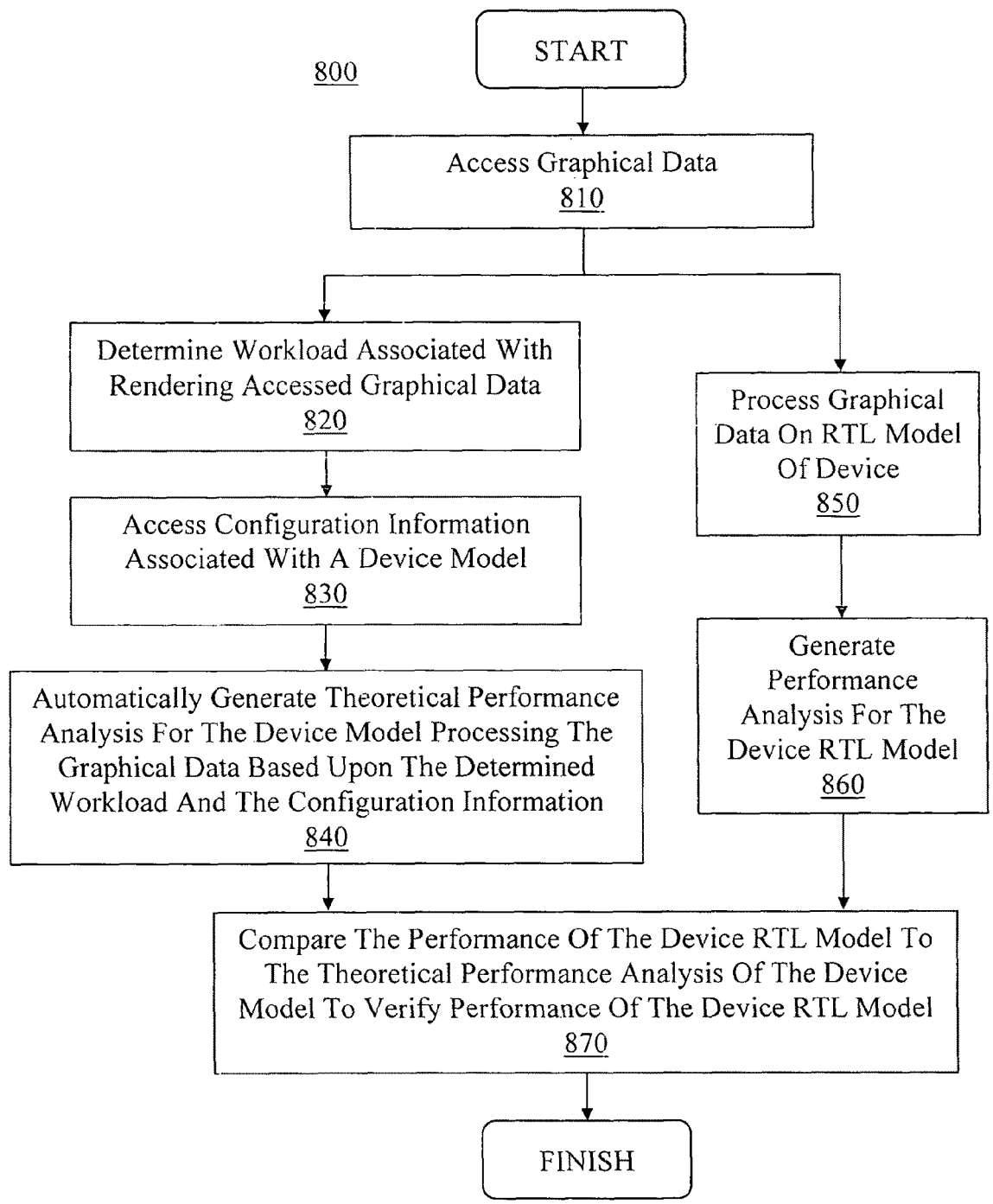
FIG. 8 shows an exemplary computer-implemented process for analyzing the performance of a device model to verify the performance of an device RTL model in accordance with one embodiment of the present invention.

FIG. 8 shows exemplary computer-implemented process 800 for analyzing the performance of a device model to verify the performance of an RTL model of a device in accordance with one embodiment of the present invention. As shown in FIG. 8, steps 810-840 may be performed analogously to steps 610-640 of FIG. 6.

Step 850 involves processing the graphical data (e.g., accessed in step 810) on an RTL model of the device. The device RTL model may be coded in a hardware description language (HDL) such as Verilog, VHDL, etc., in one embodiment. Additionally, it should be appreciated that the RTL model may be implemented by simulation (e.g., on a computer system), emulation (e.g., on re-configurable hardware), a physical device (e.g., representing a previous design or iteration of a design for comparison purposes, representing a current beta design, current final design, etc.), or the like.

As shown in FIG. 8, step 860 involves generating performance analysis for the device RTL model. The performance analysis generated in step 860 may be based upon the processing of the graphical data in step 850.

Step 870 involves comparing the performance of the device RTL model (e.g., generated in step 860) with the theoretical performance analysis of the device model (e.g., automatically generated in step 840) to verify performance of the device RTL model. In this manner, the theoretical performance analysis of the device model may used as a reference model against which the performance of the device RTL model is compared. Results from this comparison may be used to locate bugs in the design, debug the design, etc.

Figure 9:
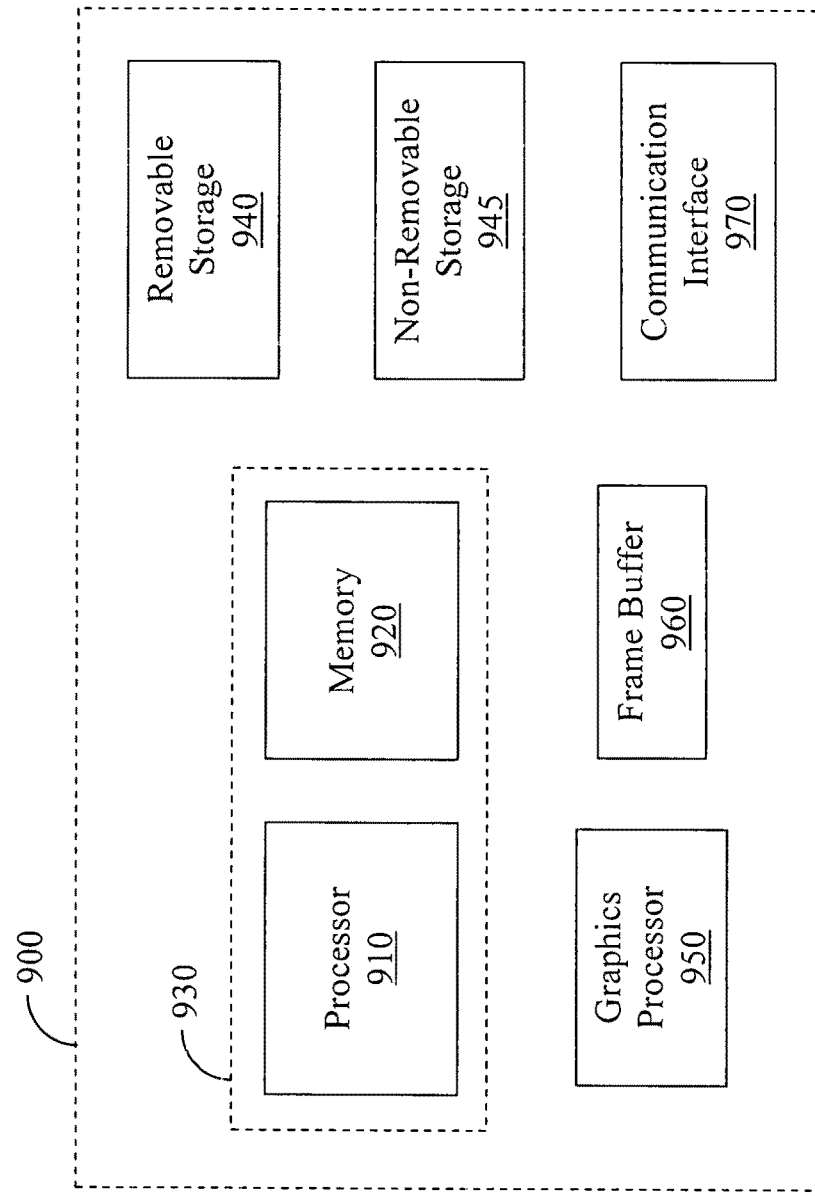
FIG. 9 shows an exemplary computer system platform upon which embodiments of the present invention may be implemented.

FIG. 9 shows exemplary computer system platform 900 upon which embodiments of the present invention may be implemented. As shown in FIG. 9, portions of the present invention are comprised of computer-readable and computer-executable instructions that reside, for example, in computer system platform 900 and which may be used as a part of a general purpose computer network (not shown). It is appreciated that computer system platform 900 of FIG. 9 is merely exemplary. As such, the present invention can operate within a number of different systems including, but not limited to, general-purpose computer systems, embedded computer systems, laptop computer systems, hand-held computer systems, portable computer systems, stand-alone computer systems, or game consoles.

In one embodiment, depicted by dashed lines 930, computer system platform 900 may comprise at least one processor 910 and at least one memory 920. Processor 910 may comprise a central processing unit (CPU) or other type of processor. Depending on the configuration and/or type of computer system environment, memory 920 may comprise volatile memory (e.g., RAM), non-volatile memory (e.g., ROM, flash memory, etc.), or some combination of the two. Additionally, memory 920 may be removable, non-removable, etc.

In other embodiments, computer system platform 900 may comprise additional storage (e.g., removable storage 940, non-removable storage 945, etc.). Removable storage 940 and/or non-removable storage 945 may comprise volatile memory, non-volatile memory, or any combination thereof. Additionally, removable storage 940 and/or non-removable storage 945 may comprise CD-ROM, digital versatile disks (DVD) or other optical storage, magnetic cassettes, magnetic tape, magnetic disk storage or other magnetic storage devices, or any other medium which can be used to store information for access by computer system platform 900.

As shown in FIG. 9, computer system platform 900 may communicate with other systems, components, or devices via communication interface 970. Communication interface 970 may embody computer readable instructions, data structures, program modules or other data in a modulated data signal (e.g., a carrier wave) or other transport mechanism. By way of example, and not limitation, communication interface 970 may couple to wired media (e.g., a wired network, direct-wired connection, etc.) and/or wireless media (e.g., a wireless network, a wireless connection utilizing acoustic, RF, infrared, or other wireless signaling, etc.). Communication interface 970 may also couple computer system platform 100 to one or more input devices (e.g., a keyboard, mouse, pen, voice input device, touch input device, etc.) and/or output devices (e.g., a display, speaker, printer, etc.).

Graphics processor 950 may perform graphics processing operations on graphical data stored in frame buffer 960 or another memory (e.g., 920, 940, 945, etc.) of computer system platform 900. In one embodiment, graphics processor 950 and processor 910 may be combined into a single unit (e.g., thereby forming a general purpose processor). Graphical data stored in frame buffer 960 may be accessed, processed, and/or modified by components (e.g., graphics processor 950, processor 910, etc.) of computer system platform 100 and/or components of other systems/devices. Additionally, the graphical data may be accessed (e.g., by graphics processor 950) and displayed on an output device coupled to computer system platform 900. Accordingly, one or more processors (e.g., processor 930, graphics processor 950, a hybrid processor formed by processor 930 and graphics processor 950, etc.) may access and/or execute instructions stored in a memory accessible to computer system platform 900 (e.g., 920, 940, 945, a memory accessed via communication interface 970, etc.) for performing a method of analyzing the performance of a device model (e.g., as discussed with respect to other Figures of the present application).

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A computer-implemented method of analyzing performance of a device model, said method comprising:
    accessing graphical data;
    determining a workload associated with rendering said graphical data;
    accessing configuration information associated with said device model;
    automatically generating theoretical performance analysis for said device model processing said graphical data, wherein said theoretical performance analysis is generated based upon said determined workload and said configuration information, and wherein said theoretical performance analysis comprises information about processing of said graphical data by at least one graphics pipeline unit of said device model; and
    outputting the theoretical performance analysis.

2. The method of claim 1, wherein said information indicates a graphics pipeline unit of said device model causing a bottleneck in a graphics pipeline of said device model.

3. The method of claim 1 further comprising:
    accessing updated configuration information associated with said device model; and
    automatically generating updated theoretical performance analysis for said device model based upon said determined workload and said updated configuration information.

4. The method of claim 1 further comprising:
    accessing configuration information associated with a second device model; and
    automatically generating theoretical performance analysis for said second device model based upon said determined workload and said configuration information associated with said second device model.

5. The method of claim 1, wherein said configuration information is independent of said determined workload.

6. The method of claim 1, wherein said graphical data comprises information selected from a group consisting of a graphical operation and state information associated with processing of said graphical operation.

7. The method of claim 1, wherein said determined workload comprises information unrelated to clock cycles, and wherein said determined workload further comprises graphical information selected from a group consisting of a number of primitives, a number of pixels, a type of shading, a number of bytes accessed by a frame buffer, and a number of texels.

8. The method of claim 1 further comprising:
    processing said graphical data on a device RTL model associated with said device model;
    generating performance analysis for said device RTL model; and
    comparing said performance analysis for said device RTL model with said theoretical performance analysis for verifying performance of said device RTL model.

9. A computer-readable storage medium comprising computer-readable program code embodied therein for causing a computer system to perform a method of analyzing performance of a device model, said method comprising:
    accessing graphical data;
    determining a workload associated with rendering said graphical data;
    accessing configuration information associated with said device model;
    automatically generating theoretical performance analysis for said device model processing said graphical data, wherein said theoretical performance analysis is generated based upon said determined workload and said configuration information, and wherein said theoretical performance analysis comprises information about processing of said graphical data by at least one graphics pipeline unit of said device model; and
    outputting the theoretical performance analysis.

10. The computer-readable storage medium of claim 9, wherein said information indicates a graphics pipeline unit of said device model causing a bottleneck in a graphics pipeline of said device model.

11. The computer-readable storage medium of claim 9, wherein said method further comprises:
    accessing updated configuration information associated with said device model; and
    automatically generating updated theoretical performance analysis for said device model based upon said determined workload and said updated configuration information.

12. The computer-readable storage medium of claim 9, wherein said method further comprises:
    accessing configuration information associated with a second device model; and
    automatically generating theoretical performance analysis for said second device model based upon said determined workload and said configuration information associated with said second device model.

13. The computer-readable storage medium of claim 9, wherein said configuration information is independent of said determined workload, and wherein said graphical data comprises information selected from a group consisting of a graphical operation and state information associated with processing of said graphical operation.

14. The computer-readable storage medium of claim 9, wherein said determined workload comprises information unrelated to clock cycles, and wherein said determined workload further comprises graphical information selected from a group consisting of a number of primitives, a number of pixels, a type of shading, a number of bytes accessed by a frame buffer, and a number of texels.

15. The computer-readable storage medium of claim 9, wherein said method further comprises:
    processing said graphical data on a device RTL model associated with said device model;
    generating performance analysis for said device RTL model; and
    comparing said performance analysis for said device RTL model with said theoretical performance analysis for verifying performance of said device RTL model.

16. A computer system comprises a processor and a memory, wherein said memory comprises instructions that when executed on said processor implement a method of analyzing performance of a device model, said method comprising:
    accessing graphical data;
    determining a workload associated with rendering said graphical data;
    accessing configuration information associated with said device model;
    automatically generating theoretical performance analysis for said device model processing said graphical data, wherein said theoretical performance analysis is generated based upon said determined workload and said configuration information, and wherein said theoretical performance analysis comprises information about processing of said graphical data by at least one graphics pipeline unit of said device model; and outputting the theoretical performance analysis.

17. The computer system of claim 16, wherein said information indicates a graphics pipeline unit of said device model causing a bottleneck in a graphics pipeline of said device model.

18. The computer system of claim 16, wherein said method further comprises:

accessing updated configuration information associated with said device model; and automatically generating updated theoretical performance analysis for said device model based upon said determined workload and said updated configuration information.

19. The computer system of claim 16, wherein said method further comprises:

accessing configuration information associated with a second device model; and automatically generating theoretical performance analysis for said second device model based upon said determined workload and said configuration information associated with said second device model.

20. The computer system of claim 16, wherein said configuration information is independent of said determined workload, and wherein said graphical data comprises information selected from a group consisting of a graphical operation and state information associated with processing of said graphical operation.

21. The computer system of claim 16, wherein said determined workload comprises information unrelated to clock cycles, and wherein said determined workload further comprises graphical information selected from a group consisting of a number of primitives, a number of pixels, a type of shading, a number of bytes accessed by a frame buffer, and a number of texels.

22. The computer system of claim 16, wherein said method further comprises:

processing said graphical data on a device RTL model associated with said device model;

generating performance analysis for said device RTL model; and comparing said performance analysis for said device RTL model with said theoretical performance analysis for verifying performance of said device RTL model.

* * * * *